United States Patent [19]

Püntener

[11] Patent Number: 4,801,695

[45] Date of Patent: Jan. 31, 1989

[54] IRON COMPLEXES OF AZO DYES OBTAINED FROM NAPHTHYLSULFONIC ACID, RESORCINOL AND NITROAMINOPHENOL

[75] Inventor: Alois Püntener, Rheinfelden, Switzerland

[73] Assignee: Ciba-Geigy Corporation, Ardsley, N.Y.

[21] Appl. No.: 27,102

[22] Filed: Mar. 13, 1987

Related U.S. Application Data

[63] Continuation of Ser. No. 742,343, Jun. 7, 1985, abandoned.

[30] Foreign Application Priority Data

Jun. 12, 1984 [CH] Switzerland .................. 2836/84

[51] Int. Cl.$^4$ ............... C09B 45/34; C09B 45/32; D06P 1/10
[52] U.S. Cl. .................. 534/684; 534/688; 8/425; 8/437; 8/685
[58] Field of Search ................ 534/684, 688

[56] References Cited

U.S. PATENT DOCUMENTS

| 2,117,707 | 1/1937 | Daudt ................. | 260/84 |
| 2,136,650 | 11/1938 | Crossley et al. ........ | 534/688 |
| 2,200,445 | 5/1940 | Fellmer .............. | 534/688 |
| 4,547,566 | 10/1985 | Bergmann et al. ...... | 534/684 |

FOREIGN PATENT DOCUMENTS

| 91020 | 12/1983 | European Pat. Off. . | |
| 113643 | 7/1984 | European Pat. Off. ........ | 534/684 |
| 278142 | 11/1913 | Fed. Rep. of Germany . | |

OTHER PUBLICATIONS

Venkataraman, *The Chemistry of Synthetic Dyes*, vol. I, pp. 415–416 (1952).

*Primary Examiner*—Glennon H. Hollrah
*Assistant Examiner*—Carolyn Greason
*Attorney, Agent, or Firm*—Edward McC. Roberts

[57] ABSTRACT

Iron complex dyes which are particularly suitable for dyeing leather in brown shades are obtained by coupling a naphthylaminesulfonic acid with resorcinol, subsequently coupling the reaction product with 4-nitro-2-aminophenol and metallizing with an iron compound.

8 Claims, No Drawings

IRON COMPLEXES OF AZO DYES OBTAINED FROM NAPHTHYLSULFONIC ACID, RESORCINOL AND NITROAMINOPHENOL

This application is a continuation, of application Ser. No. 742,343, filed 6/7/85, now abandoned.

The present invention relates to iron complexes of azo dyes which are obtainable by diazotising a naphthylaminesulfonic acid of formula I

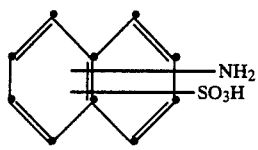

coupling the diazonium compound so obtained with resorcinol, subsequently coupling the reaction product with diazotised 4-nitro-2-aminophenol and finally metallising with an iron compound.

Iron complexes of azo dyes obtained from resorcinol and two different diazo components are already known from U.S. Pat. No. 2,200,445. According to said specification, the order in which the coupling is carried out is optional, but in the specific Examples a diazo component containing a complex-forming group is always coupled first.

It has been found that dyes of the present invention, in which first the naphthylaminesulfonic acid is coupled and then 4-nitro-2-aminophenol, have surprisingly advantageous properties.

Thus for example, compared with the nearest comparable dye of U.S. Pat. No. 2,200,445, in which the coupling is carried out in reverse order, the iron complex of the dye of the present invention, obtained by coupling 2-naphthylamine-6-sulfonic acid with resorcinol and subsequently coupling the reaction product with diazotised 4-nitro-2-aminophenol, surprisingly exhausts better on leather and has better build-up on leather and also has increased stability to acid.

Suitable naphthylaminesulfonic acids of formula I for the preparation of dyes of the present invention are e.g. 1-naphthylamine-2-, -3-, -4-, -5-, -6-, -7- or -8-sulfonic acid, 2-naphthylamine-1-sulfonic acid or, preferably, 2-naphthylamine-5-, -7- or -8-sulfonic acid and, most preferably, 2-naphthylamine-6-sulfonic acid.

The coupling reactions are carried out under normal conditions which are known per se. The coupling of resorcinol with the diazotised naphthylaminesulfonic acid is conveniently carried out in aqueous medium at a pH of 3 to 7, preferably of 4 to 6, and the coupling of the resultant monoazo dye with diazotised 4-nitro-2-aminophenol at a pH of 7 to 12, preferably of 8 to 10.

0.95 to 1.25 mol, preferably 1.0 to 1.2 mol, of naphthylaminesulfonic acid are used per mol of resorcinol and for the coupling with the monoazo dye 0.9 to 1.05 mol, preferably 0.95 to 1 mol, of 4-nitro-2-aminophenol are used per mol of resorcinol.

The resultant dye is subsequently metallised, preferably without isolation, in a manner known per se in aqueous or aqueous-organic medium with an iron compound, e.g. iron(III) chloride, iron(III) nitrate or iron(III) sulfate, preferably at a pH of 5 to 7. It is convenient to use 0.5 to 0.7 mol, preferably 0.5 to 0.6 mol, of iron compound per mol of resorcinol.

The novel iron complex dyes obtainable by the above process are isolated in the form of their salts, in particular their alkali metal salts, most particularly their sodium or potassium salts, or also their ammonium salts or salts of organic amines with positively charged nitrogen atom, and are suitable for dyeing and printing various materials, in the presence or absence of a levelling assistant, in particular for dyeing and printing nitrogen-containing materials such as silk, polyurethanes, wool, polyamide and, especially furs or leather, with all types of leather being suitable, e.g. chrome leather, retanned leather or suede leather obtained from goatskin, cowhide and pigskin.

Brown dyeings of good fastness properties are obtained.

The invention is illustrated by the following Example without implying any restriction to what is claimed therein. Parts and percentages are by weight.

EXAMPLE 11 parts of resorcinol are added to 100 parts of water and then 26.8 parts of 2-naphthylamine-6-sulfonic acid, which have been diazotised in a manner known per se with acid and nitrite, are added. The pH is adjusted to a slightly acidic value by the addition of 2 molar sodium hydroxide solution. On completion of the first coupling, 15.4 parts of 2-amino-4-nitrophenol, which have likewise been diazotised in known manner, are added, while keeping a slightly alkaline pH value by the addition of 2 molar sodium hydroxide solution. On completion of the second coupling, the resultant dye is metallised with 50 ml of 1 molar iron(III) chloride solution for 6 hours at 80° C., while keeping a neutral to slightly acidic pH value with the addition of 2 molar sodium hydroxide solution. The dye is subsequently salted out with 25 parts of a 1:1 mixture of potassium chloride and sodium chloride per 100 ml of solution, then isolated by filtration and dried. The resultant dark powder dyes leather in a reddish brown shade of good fastness properties.

By repeating the procedure described in the above Example but using the same amounts of 1-naphthylamine-4-sulfonic acid or 2-naphthylamine-5-sulfonic acid in place of 2-naphthylamine-6-sulfonic acid, dyes which dye leather in a brown shade of good fastness properties are also obtained.

Dyeing Procedure for leather 100 parts of garment suede leather are wet back at 50° C. for 2 hours in a solution of 1000 parts of water and 2 parts of 24'% ammonia and subsequently dyed for 1 hour at 60° C. in a solution of 1000 parts of water, 2 parts of 24% ammonia and 3 parts of the dye of the Example. A solution of 40 parts of water and 4 parts of 85% formic acid is then added and dyeing is continued for a further 30 minutes. The leather is then thoroughly rinsed and, if desired, treated for 30 minutes at 50° C. with 2 parts of a dicyandiamine/formaldehyde condensation product. A brown dyeing of good fastness properties is obtained.

What is claimed is:

1. An iron complex of an azo dye prepared by diazotizing a naphthylamine sulfonic acid selected from the group consisting of 2-naphthylamine-5-sulfonic acid, 2-naphthylamine-6-sulfonic acid, 2-naphthylamine-7-sulfonic acid 2-naphthylamine-8-sulfonic acid; coupling the resulting diazonium compound with resorcinol at a pH of from 3 to 7 to form the first coupling-reaction product; subsequently coupling the first coupling reaction product with diazotized 4-nitro-2-aminophenol to form the second coupling-reaction product; and metallizing the second coupling-reaction product with an iron compound.

2. An iron complex according to claim 1 wherein said naphthylaminesulfonic acid is 2-naphthylamine-6-sulfonic acid.

3. An iron complex according to claim 1 wherein the molar ratio of naphthylaminesulfonic acid used to resorcinol used is 1.0 to 1.2.

4. An iron complex according to claim 1 wherein the molar ratio of 4-nitro-2-aminophenol used to resorcinol used is 0.95 to 1.

5. An iron complex according to claim 1 wherein the molar ratio of iron compound used to resorcinol used is 0.5 to 0.6.

6. An iron complex according to claim 1 wherein said iron compound is iron (III) chloride, iron (III) nitrate or iron (III) sulfate.

7. An iron complex according to claim 1 wherein said coupling of the diazonium compound with resorcinol is conducted at a pH of from 4 to 6.

8. An iron complex of an azo dye prepared by:
(a) coupling diazotized 2-naphthylamine-6-sulfonic acid with resorcinol at a pH of from .4 to 6, the molar ratio of said sulfonic acid used to resorcinol used being 1.0 to 1.2;
(b) subsequently coupling the product of step (a) with diazotized 4-nitro-2-aminophenol at a pH from 8 to 10, the molar ratio of said 4-nitro-2-aminophenol used to resorcinol used being 0.95 to 1; and
(c) metallizing the product of step (b) with iron (III) chloride, nitrate or sulfate, the molar ratio of said iron compound used to resorcinol used being 0.5 to 0.6.

* * * * *